(12) United States Patent
Thornton et al.

(10) Patent No.: US 7,197,749 B2
(45) Date of Patent: Mar. 27, 2007

(54) METHOD AND SYSTEM FOR EXECUTING BATCH JOBS BY DELEGATING WORK TO INDEPENDENT SERVICE PROVIDERS

(75) Inventors: James D. Thornton, Redwood City, CA (US); Richard R. Burton, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 800 days.

(21) Appl. No.: 09/740,076

(22) Filed: Dec. 19, 2000

(65) Prior Publication Data

US 2002/0078130 A1 Jun. 20, 2002

(51) Int. Cl.
G06F 9/46 (2006.01)
G06F 9/50 (2006.01)
G06F 15/16 (2006.01)

(52) U.S. Cl. .................. 718/101; 718/104; 709/201
(58) Field of Classification Search ............. 709/201, 709/101, 100–108; 718/101, 104
See application file for complete search history.

(56) References Cited

U.S. PATENT DOCUMENTS

| | | | |
|---|---|---|---|
| 5,581,691 A | 12/1996 | Hsu et al. | |
| 5,781,711 A | 7/1998 | Austin et al. | |
| 5,937,388 A | 8/1999 | Davis et al. | 705/8 |
| 5,974,462 A * | 10/1999 | Aman et al. | 709/225 |
| 6,009,455 A | 12/1999 | Doyle | |
| 6,112,225 A * | 8/2000 | Kraft et al. | 709/202 |
| 6,112,243 A | 8/2000 | Downs et al. | 709/226 |
| 6,125,390 A | 9/2000 | Touboul | 709/223 |
| 6,230,183 B1 * | 5/2001 | Yocom et al. | 718/105 |
| 6,549,936 B1 * | 4/2003 | Hirabayashi | 709/205 |
| 6,598,067 B1 | 7/2003 | Wydra et al. | |
| 6,632,251 B1 | 10/2003 | Rutten et al. | |
| 6,711,616 B1 * | 3/2004 | Stamm et al. | 709/226 |
| 6,757,730 B1 * | 6/2004 | Lee et al. | 709/226 |
| 6,826,753 B1 * | 11/2004 | Dageville et al. | 718/102 |
| 7,003,547 B1 * | 2/2006 | Hubbard | 709/201 |

(Continued)

FOREIGN PATENT DOCUMENTS

| | | | |
|---|---|---|---|
| EP | 0 942 363 A2 | | 9/1999 |
| JP | 06059913 A | * | 3/1994 |
| JP | 08095810 A | * | 4/1996 |
| JP | 08286778 A | * | 11/1996 |
| JP | 09016521 A | * | 1/1997 |
| JP | 2003296125 A | * | 10/2003 |

OTHER PUBLICATIONS

Fischer, M., "Parallelstrategie," CT Magazin Fuer Computer Technik, Verlag Heinz Heise GMBH., Hannover, DE, No. 9, Apr. 26, 1999, pp. 148-151, XP000823045, ISSN: 0724-8679.
"DocuPrint 1.5 Job Pool Manager API Programming Guide and Reference," *Xerox Corporation*, Feb. 3, 1998.
"DocuPrint NPS 7.0 Job Pool Manager Application Programming Interface Programming Guide and Reference," *Xerox Corporation*, El Segundo, California, Nov. 1999.
"LSF Batch User's Guide," XP-002336279, 6th ed., Platform Computing Corporation (Aug. 1998).

* cited by examiner

*Primary Examiner*—William Thomson
*Assistant Examiner*—Li Zhen
(74) *Attorney, Agent, or Firm*—Fliesler Meyer LLP (57) ABSTRACT

A job management apparatus for use in a batch job execution system is provided. The job management apparatus includes a client communications part which receives a batch job from a client, an extracting part which extracts a task from the batch job, and an assigning part which receives signals from the service providers and delegates a task to a service provider who is capable of performing such task. The job management apparatus is in communication with a job database which stores the batch job after it is received from the client. At least one provider manager is in communication with the job management apparatus and in communication with the service providers which monitors the tasks as they are being performed on a service provider and provides status information about the task to the job management apparatus. The service providers are configured to output signals to the job management apparatus requesting work.

21 Claims, 5 Drawing Sheets

METHOD AND SYSTEM FOR EXECUTING BATCH JOBS BY DELEGATING WORK TO INDEPENDENT SERVICE PROVIDERS

FIELD

The present invention relates generally to the execution of batch jobs. More particularly, the present invention relates to managing the execution of batch jobs by delegating tasks to independent service providers responsive to requests for work.

CROSS-REFERENCE TO RELATED APPLICATIONS

The following U.S. patent application is assigned to the assignee of the present application, is related to the present application and its disclosure is incorporated herein by reference:

U.S. patent application Ser. No. 09/740,487, filed on Dec. 19, 2000 by Michelle Q. Wang Baldonado, Richard R. Burton, Steve B. Cousins, Kenneth A. Pier, and James D. Thornton, entitled a "SYSTEM FOR CREATING EFFICIENT MULTI-STEP DOCUMENT CONVERSION SERVICES."

BACKGROUND

Users of modern day computer systems and networks are imposing increasing demands on such systems to perform wider varieties and larger quantities of work. Because of these demands, it is becoming important to structure the work of a job in some organized form for processing. A "batch job" is one organized form in which work may be structured. A batch job may be any combination or grouping of files, documents or other information that work is to be performed on. The work is generally divided into a predefined series of tasks for processing.

Modern computing systems and networks provide for new and different kinds of work which are amenable to batch job processing. For example, the job of converting a group of word processing documents having the same format to an HTML format may be organized as a batch job. In this way, the user may simply specify a single set of parameters for converting all of the documents in the group, as opposed to performing the repetitious task of having to specify the same parameters for each and every document.

Batch jobs are to be contrasted with actions or commands in interactive applications which often require only a single function or key stroke to complete the entire job. For example, a "cut" or "paste" technique provided by a word processor program is one such command. Immediate feedback is possible with commands like cut or paste. After a user selects some text in a document, the cut operation is performed by a single press of a mouse button or function key on a computer keyboard. The user can immediately see the change to the document he is editing.

A batch job is more complex than single-function commands, because the batch job permits a variety of services to be combined. The individual tasks comprising the batch job are often different from one another, each requiring a different processing technique or function for completion. The various functions needed to perform the batch job nay only be available from different sources. For example, several applications or programs may be necessary, some or all of which may be operating on different machines. Thus, immediate results often cannot be obtained when the batch job is processed because of the number of different services which must be performed to process the various tasks, the coordination and sequencing of these services, and various delays associated with performing the particular services.

SUMMARY

The present invention described roughly, includes a method and system for executing a batch job including a plurality of tasks, and in particular computer software for executing a batch job is provided.

According to one aspect of the present invention, a job management apparatus for use in a batch job execution system which includes a plurality of service providers which are in communication with the job management apparatus is provided. The job management apparatus includes a client communications part which receives a batch job from a client, an extracting part which extracts a task from the batch job, and an assigning part which receives signals from the service providers requesting work and delegates a task to a service provider in response to the signal that it is capable of performing such task.

According to another aspect of the present invention, a batch job execution system for communicating with at least one client includes a job management apparatus which is in communication with a number of clients. The job management apparatus receives a batch job from a client, extracts tasks from the batch job and assigns tasks to service providers. The job management apparatus also is in communication with a job database which stores the batch job after it is received from the client. At least one provider manager is in communication with the job management apparatus and in communication with the service providers which monitors the tasks as they are being performed on a service provider and provides status information about the task to the job management apparatus.

According to one aspect of the present invention, a first service provider is configured to output a first request_work signal, and a second service provider is configured to output a second request_work signal. A job management apparatus includes an assigning part and a contact part in communication with the first and second service providers. The assigning part is configured to delegate one of the tasks to the first service provider responsive to receiving the first request_work signal, and to delegate another one of the tasks to the second service provider responsive to receiving the second request_work signal.

According to yet another aspect of the present invention, an article of manufacture including an information storage medium is provided. The article of manufacture comprises a client communications software component which receives a batch job from a client. The article of manufacture further comprises an extracting software component which extracts a task from the batch job received from the client and an assigning software component which receives a first signal from at least one of a plurality of service providers which informs the assigning software component of that service provider's ability to perform a task. The assigning software component, in response to receiving the signal delegates the task to the service providers capable of performing the tasks.

According to yet another aspect of the invention, the article of manufacture includes an assigning software component for monitoring which service providers are able to perform a task.

According to another aspect of the invention, the article of manufacture also includes a contact software component which receives a second signal from the plurality of service providers which informs the contact software component of the status of the task that is currently being performed. In an aspect of the invention the first signal specifies a minimum frequency at which the second signal will be sent to the contact software component.

According to an aspect of the invention, the article of manufacture further includes a job database software component which stores the batch job upon receipt from the client. The client communications software component is in communication with the job database software component.

According to still another aspect of the present invention the article of manufacture includes a retrieving software component which retrieves the batch job from the job database software component when the batch job is to be executed.

According to another aspect of the invention, the article of manufacture further includes at least one provider manager software component which is in communication with the plurality of service providers. The provider manager software component monitors the tasks being performed on the service providers and provides status information to the job management software component.

Other aspects and advantages of the present invention can be seen upon review of the figures, the detailed description, and the claims which follow.

BRIEF DESCRIPTION

DETAILED DESCRIPTION

Figure 1:
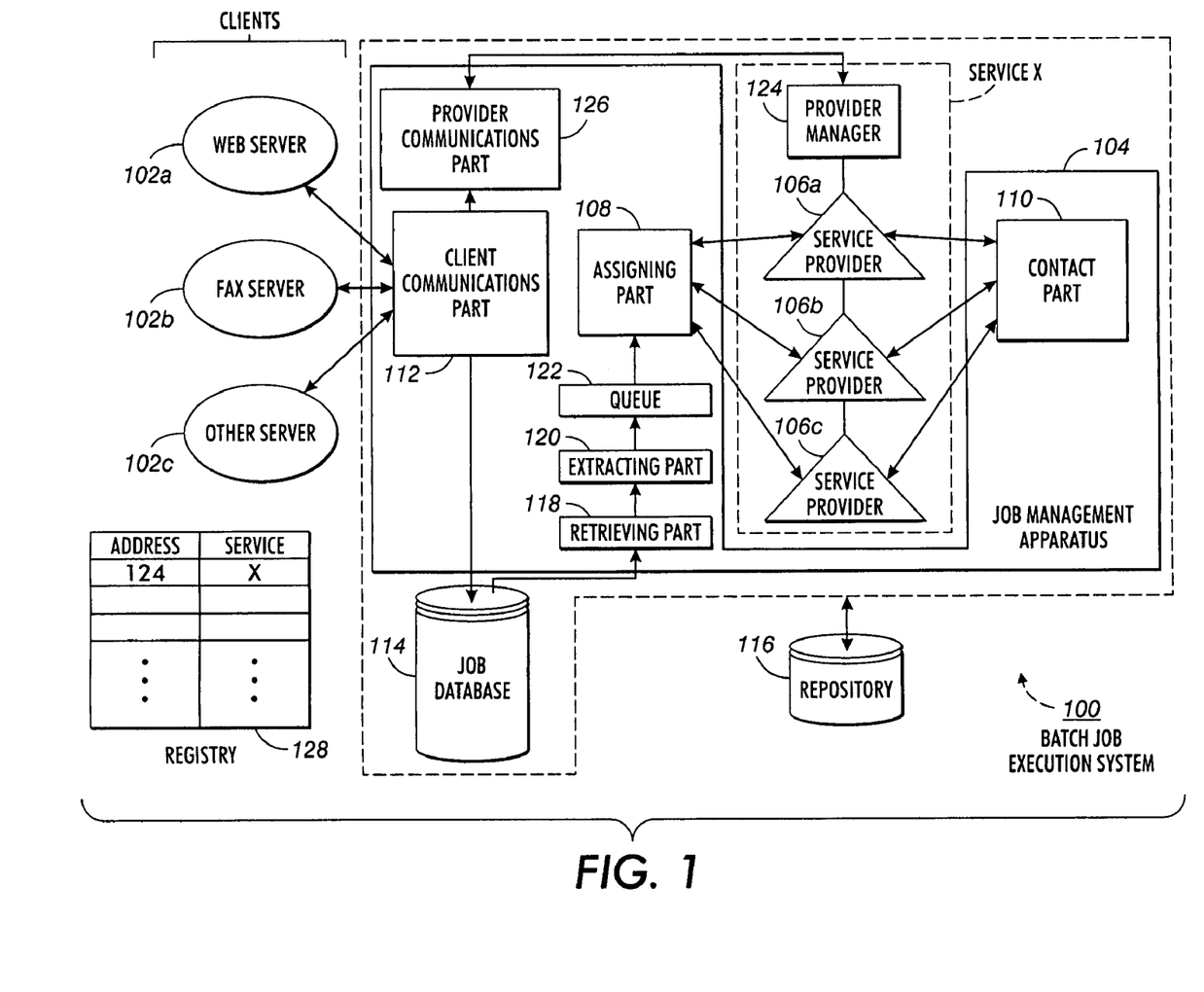
FIG. 1 is a generalized block diagram of a batch job execution system 100 constructed according to an embodiment of the present invention.

FIG. 1 is a batch job execution system 100, according to an embodiment of the present invention. Batch job execution system 100 communicates with a plurality of clients 102a–102c. Batch job execution system 100 receives batch jobs from clients 102a–102c and performs the jobs for these clients. Batch job execution system 100 is compatible with a broad range of clients. For example, in FIG. 1, client 102a is a World Wide Web ("web") server, client 102b is a facsimile transmission ("fax") server, and client 102c is some other type of server. Clients 102a–102c each have interfaces for communication with users. For example, web server 102a has a graphical user comprising a set of a web pages. The web pages are uniquely identifiable by Uniform Resource Locators ("URL"), so server 102a is easily accessible by a user operating a personal computer with a modern and Internet access software. Similarly, fax server 102b has a user interface to communicate with a user operating a personal computer or fax machine.

In FIG. 1, batch job execution system 100 includes a job management apparatus 104 which is responsible for communicating with clients 102a–102c and managing the execution of batch jobs submitted by the clients. This includes delegating tasks to a plurality of independent service providers 106a–106c, and monitoring the progress of independent service providers 106a–106c in performing the tasks.

In an embodiment of the present invention, the job management apparatus 104 and each of its associated parts may represent a software program, a software object, a software function, a software subroutine, a software method, a software instance, a code fragment, a hardware operation or user operation, singly or in combination As will be appreciated by one skilled in the art the job management apparatus 104 may be implemented using one or a plurality of computers or servers in communication with one another.

In FIG. 1, job management apparatus 104 includes an assigning part 108 which communicates with the service providers 106a–106c. Assigning part 108 receives request_ work signals from service providers 106a–106c and responds as described below. Other embodiments of job management apparatus 104 include additional assigning parts which are on the same or different servers from assigning part 108.

In FIG. 1, job management apparatus 104 further includes a contact part 110 to which the various service providers 106a–106c send signals to report on the status of work in progress. In other embodiments, additional contact parts are employed, some or all of which are on different servers than contact part 110. When additional contact parts are incorporated, each time a unit of work is delegated to a particular service provider, assigning part 108 identifies a specific contact part to which report messages should be sent in a response signal to the request for work.

In FIG. 1, job management apparatus 104 of batch job execution system 100 includes a client communications part 112 as an interface for communications with clients 102a–102c. Client communications part 112 receives batch jobs, requests, documents and other information from clients 102a–102c and sends signals to clients 102a–102c indicating the progress of a batch job In FIG. 1, batch job execution system 100 includes a job database 114. When a batch job is received from one of clients 102a–102c by client communications part 112, the job is stored in job database 114. The batch job stored in job database 114 includes various types of information and parameters including references to particular documents, the status of jobs, names and other information identifying clients 102a–102c, and options for performing jobs. The information stored in job database 114 is regularly updated as existing jobs are executed by batch job execution system 100 and new jobs are received. The presence of job database 114 is desirable to maintain a persistent and reliable record of the jobs as they are executed by job execution system 100. Other useful information may be stored within job database 114, as will be appreciated by the skilled artisan.

In FIG. 1, a repository 116 is also provided. The repository 116 is a database built on a file system or other suitable storage medium. The repository 116 may be situated on either the same computer or on a different computer than batch job execution system 100. Documents and other various files are stored in repository 116. When documents and files are submitted with a batch job by clients 102a–102c, these documents and files are stored in repository 116. Batch jobs, received by client communications part 112 from clients 102a–102c, often include information identifying one or more of the documents stored in repository 116. In one example, this information is a path name identifying the location of a particular document within the hierarchy of repository 116. When job management apparatus 104 manages the execution of various batch jobs, these jobs may use some of the same documents in repository 116 for processing, and may create new documents in repository 116.

In FIG. 1, job management apparatus 104 includes a retrieving part 118 which retrieves a batch job stored in job database 114 when the batch job is to be executed. An extracting part 120 extracts the individual tasks which comprise the batch job and queues these tasks in a queue 122 using any execution parameters required to process the batch job. These parameters are specified by the user when he submits the batch job to a client, as described in greater detail below.

In FIG. 1, independent service providers 106a–106c communicate with assigning part 108 and contact part 110 of job management apparatus 104. In the present embodiment, service providers 106a–106c all provide the same service, namely "Service X." In this way, service providers can be easily added and removed, and provider manager 124 can easily manage its various service providers.

In FIG. 1, service providers 106a–106c operate independent from one another and from job execution system 100. Service providers may "start" or "stop" operations without any involvement from job execution system 100. Thus, operation of job execution system 100 is simplified. That is, the job execution system need not determine when a particular service provider is available to perform work, or otherwise attempt to "push" tasks to the service providers. Nor does the job execution system need to monitor the service providers as they perform the tasks delegated by the job execution system.

In FIG. 1, the various service providers 106a–106c are operating on different machines or computers while communicating with the job management apparatus 104 which operates on another machine. In another embodiment, job management apparatus 104 and service providers 106a–106c operate on the same machine, such as an Internet server. In different embodiments, various data networks are used to provide the connection between the service providers 106a–106c and job management apparatus 104, such as private networks and public networks like the Internet. In other embodiments, data networks including local area networks, frame relay networks, and ATM networks are used.

Service providers used with embodiments of the present invention take various forms. In one embodiment, one part of a service provider is a human. In another embodiment, a service provider is a program functioning as an interface for a human who performs part or all of a task. In yet another embodiment, service providers are programs running on computers.

In some embodiments, service providers interface with a plurality of job execution systems. For example, in FIG. 1, service provider 106c performs a French-to-English translation service for both batch job execution system 100 and another batch job execution system not shown in FIG. 1. Provider 106c performs multiple tasks for the various job execution systems using multiple threads or processes. To that end, any particular service provider used in an embodiment of a job execution system of the present invention may perform multiple tasks simultaneously using threads, processes, people, or other programs running on multiple computers.

In FIG. 1, a provider manager 124 is associated with the service providers 106a–106c. The provider manager 124 functions as a communications link between job management apparatus 104 and the service providers 106a–106c. In one embodiment, provider manager 124 is implemented on the same server as job management apparatus 104. In other embodiments, provider manager 124 is on the same server as one or more of service providers 106a–106c, or on a different server. The job management apparatus 104 instructs provider manager 124 as to which assigning part the service providers 106a–106c are to communicate with. In an embodiment, additional assigning parts may be implemented as part of the batch job execution system 100.

In FIG. 1, job management apparatus 104 sends control messages to provider manager 124 using provider communications part 126. For example, provider manager 124 can receive an "increase_capacity" signal from job management apparatus 104 indicating a backlog of work in the system. This condition arises when the rate at which service providers 106a–106c are sending request_work signals is slower than the rate at which tasks are being queued in queue 122, or when the number of jobs stored in job database 114 exceeds a certain threshold. Provider manager 124 may then contact other service providers to arrange to have some of the backlog work done. In other embodiments, provider manager 124 is in communication with other provider managers and essentially "drives" these managers. That is, provider manager 124 is configured to send signals to these other provider managers instructing them to have their associated service providers send request_work signals to assigning part 108.

If an increase_capacity signal is received from job management apparatus 104, provider manager 124 responds with a signal indicating that provider manager 124 is already operating at full capacity. In an embodiment, service providers 106a–106c may send control messages to provider manager 124. For example, a service provider may send provider manager 124 a signal indicating that it is operating at full capacity.

In FIG. 1, provider manager 124 is also useful when a service provider takes a task but fails to report back to job management apparatus 104 after some predetermined amount of time. After attempting to communicate with the particular service provider to determine the problem, provider manager 124 sends a signal to communications part 126 indicating that the service provider is still working on the task, or that the task should be reassigned to another service provider.

In alternative embodiments, provider manager 124 is used to stop the service providers from performing the tasks associated with a batch job. For example, after provider manager 124 has distributed tasks associated with a particular batch job to service providers 106a–106c, the user may signal web server 102a that he does not want the job done after all. This information is communicated through provider communications part 126 to provider manager 124 which signals service providers 106a–106c to stop working. Such is advantageous especially when the tasks involved are computationally complex and, therefore, time consuming. Service providers 106a–106c are immediately available to start working on tasks associated with other batch jobs.

In FIG. 1, provider manager 124 is identified in a registry 128 with other provider managers and indexed by a unique address. In some embodiments, Service X, the service provided by provider manager 124, is also provided by other provider managers identified in registry 128. In other embodiments, provider manager 124 is the only provider manager having associated service providers 106a–106c which offer Service X. In one embodiment, the registry is integrated with the job execution system, while in other embodiments, the registry is maintained by some external service. A provider manager registers by supplying its address, information describing the function it provides and, in some embodiments, other related information about the service providers associated with it. In other embodiments, the registry includes other information such as parameters used by the various service providers associated with the respective provider managers.

Figure 2:
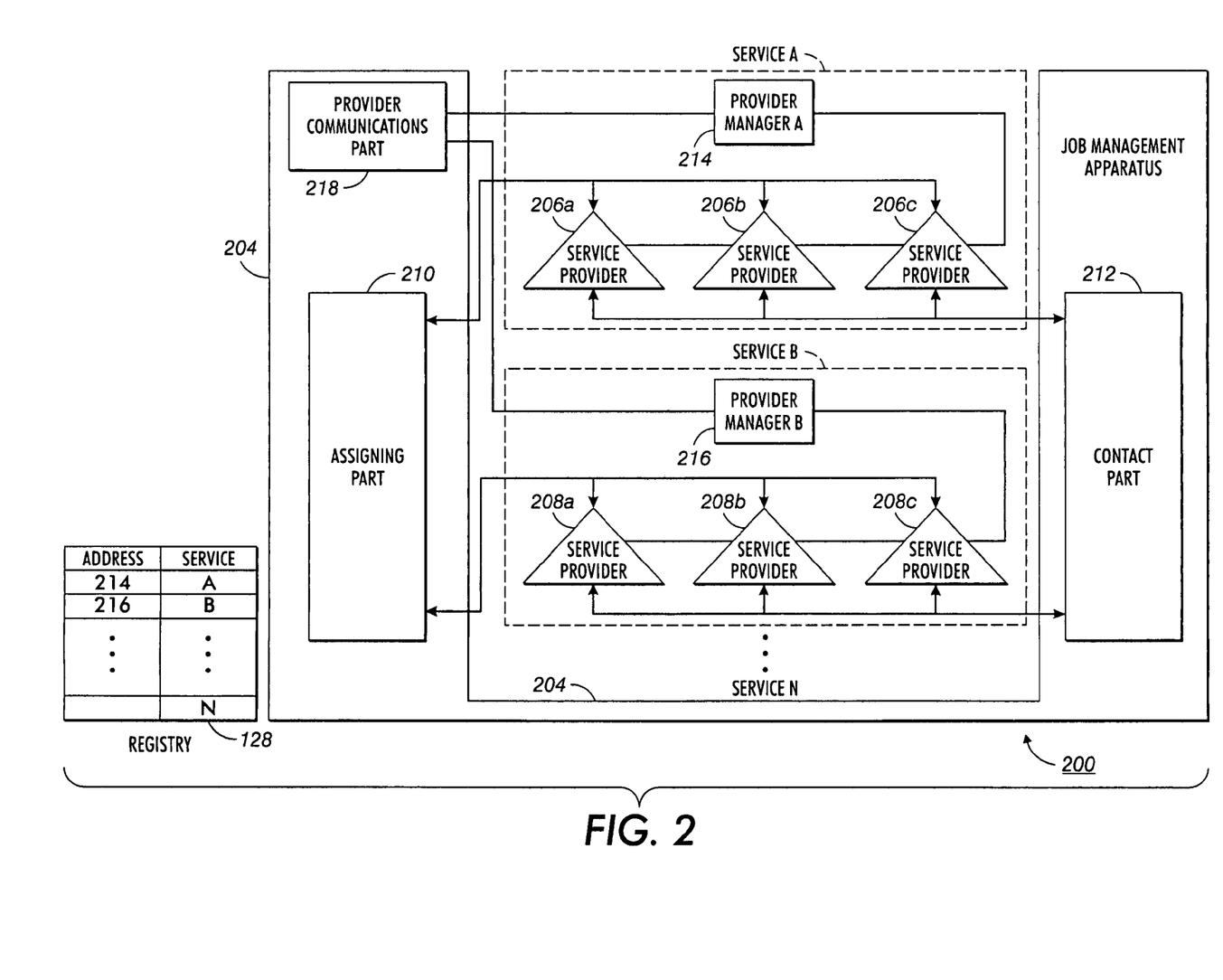
FIG. 2 is a generalized block diagram of a batch job execution system 200 constructed according to an embodiment of the present invention.

FIG. 2 is a generalized block diagram of a batch job execution system 200 constructed according to another embodiment of the present invention. Job execution system 200 is similar to job execution system 100 in some respects, but system 200 is different due to the number "N" of various services provided, as well as the configuration of service providers. The N services are different from one another, providing a broad range of services so job execution system 200 can service many different batch jobs.

In FIG. 2, a job management apparatus 204 includes an assigning part 210 which functions similar to assigning part 108 of FIG. 1. A first plurality of service providers 206a–206c are associated with Service A, a second plurality of service providers 208a–208c are associated with Service B, and so on. Service providers 206a–206c provide identical functions. Thus, it is more likely that at least one of service providers 206a–206c will be sending request_work signals to assigning part 210 at any given time. In this way, assigning part 210 can immediately delegate tasks queued in queue 122 to the requesting service provider, reducing the likelihood of a backlog of work developing.

In FIG. 2, some of the service providers operate on different machines from one another. This is because job execution system 200 imposes no constraints on the nature of service providers which can request work from job execution system 200. Batch job execution system supports a variety of service providers. In one example, service provider 206a operates on a UNIX machine, and service provider 206b operates on a Windows NT machine. In another example, service providers 206a–206c operate on the UNIX machine, and service providers 208a–208c all operate on the Windows NT machine. In yet another example, service provider 208a operates on the same machine as service provider 206a, service provider 208b operates on the same machine as service provider 206b, and so on.

In FIG. 2, the service providers communicate with assigning part 210 to receive work from job management apparatus 204. Other embodiments include additional assigning parts which are on the same or different servers from assigning part 210. In one example, one assigning part is on a UNIX machine with one service provider, and other assigning parts are on Windows NT machines with other service providers. When additional assigning parts are implemented as part of batch job execution system 200, job management apparatus 204 instructs provider managers 214 and 216 as to which assigning part the service providers associated with the respective provider managers are to communicate with.

In FIG. 2, job management apparatus 204 further includes a contact part 212 with which the various service providers communicate. In other embodiments, additional contact parts are employed. For example, some contact parts are on UNIX machines, and other contact parts are on Windows NT machines. These may be the same machines on which various service providers are operating, or they may be networked to these machines over any data network such as a local area network or the Internet.

In FIG. 2, a first provider manager 214 is associated with service providers 206a–206c, and a second provider manager 216 is associated with service providers 208a–208c. Each provider manager functions similar to provider manager 124 in FIG. 1 in managing communications between the respective service providers and provider communications part 218. As with the provider manager 124 of FIG. 1, provider managers 214, and 216 in system 200 are also identified in a registry.

Figure 3:
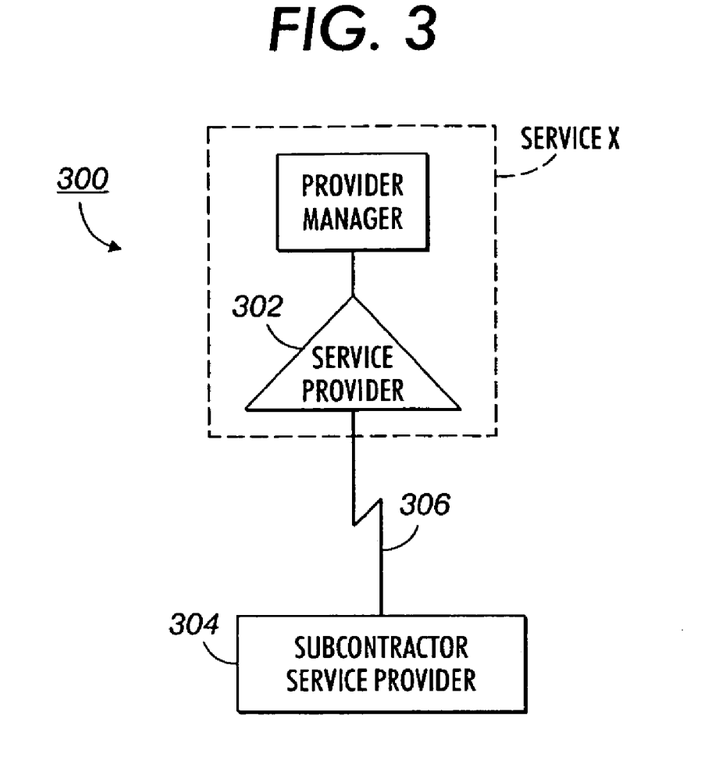
FIG. 3 is a generalized block diagram of a service provider in communication with a subcontractor service provider in a 3batch job execution system constructed according to an embodiment of the present invention.

FIG. 3 is a generalized block diagram of a service provider 302 in communication with an external subcontractor service provider 304 in a batch job execution system 300 constructed according to an embodiment of the present invention. In an embodiment, service provider 302 operates on a UNIX machine and interfaces with a job management apparatus similar to the service providers described above with respect to FIGS. 1 and 2. Service provider 302 communicates with subcontractor 304 over any data network 306 such as the Internet.

In one example of FIG. 3, subcontractor 304 is a "print shop" which provides a printing service for documents sent to service provider 302. In another example, subcontractor 304 is a translator which translates the document from one language to another. Service provider 302 receives documents for translation from the job management apparatus and sends the documents to the subcontractor 304 for translation by human translators. After translation, subcontractor 304 sends the translated documents to some designated recipient, or sends the translated documents back to service provider 302 which may report these results to a user.

Figure 4:
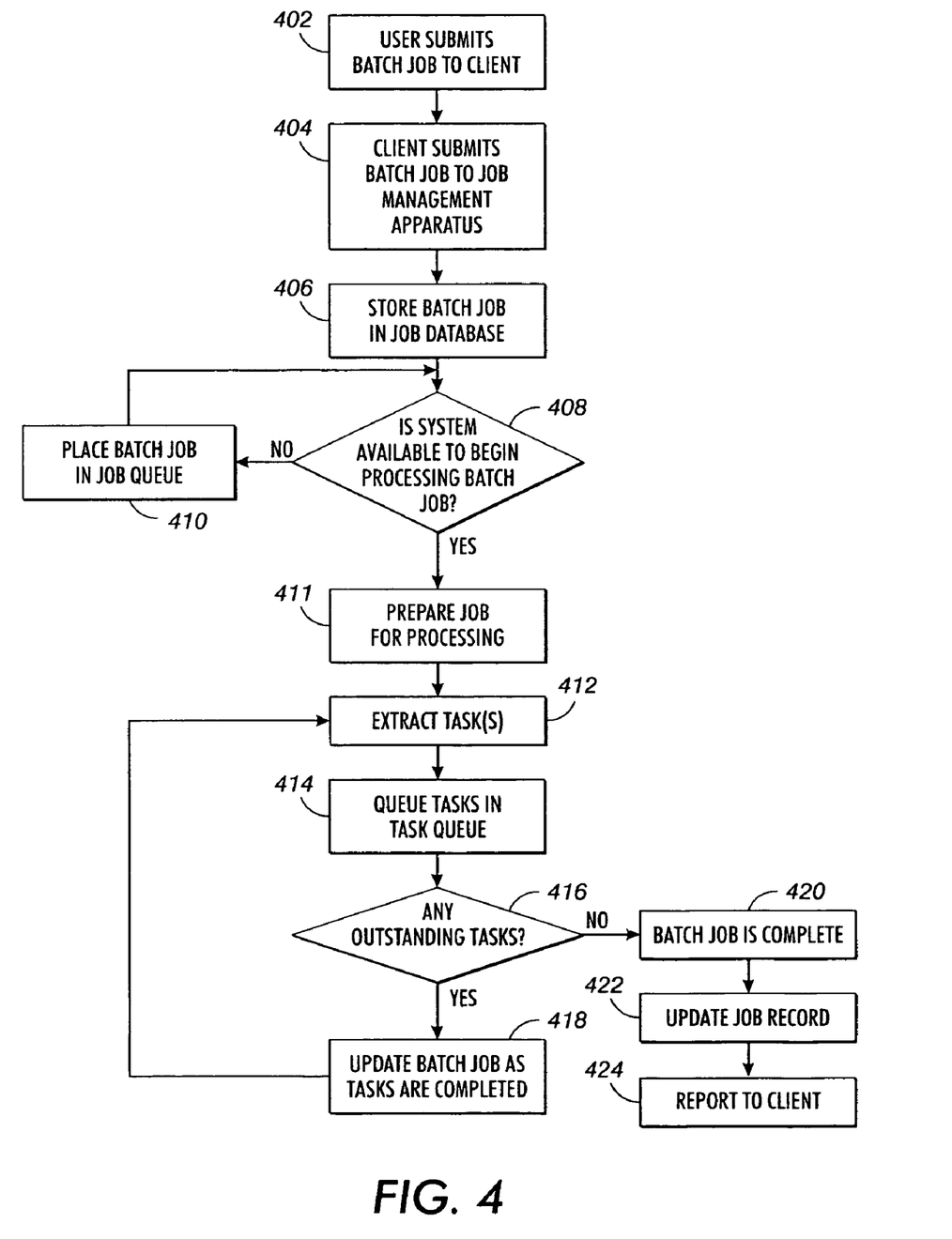
FIG. 4 is a generalized flow diagram illustrating a method of preparing a batch job for execution by a batch job execution system according to an embodiment of the present invention.

FIG. 4 is a generalized flow diagram illustrating a method of preparing a batch job for execution by batch job execution system 100 according to an embodiment of the present invention.

Figure 5:
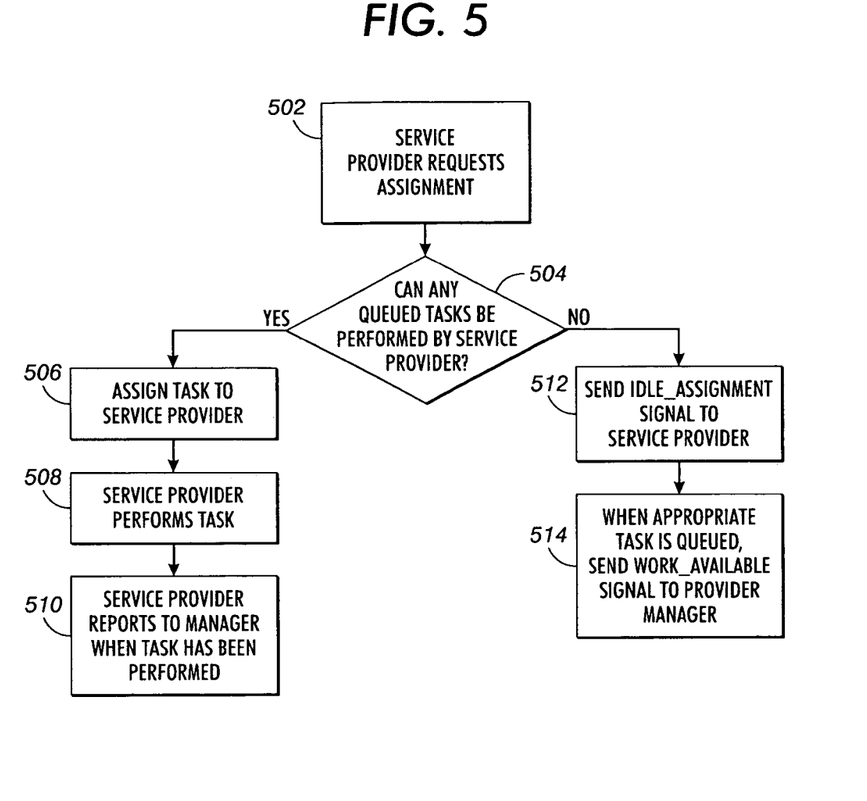
FIG. 5 is a generalized flow diagram illustrating a method of delegating tasks for execution by service providers in a batch job execution system constructed according to an embodiment of the present invention.

As one who is skilled in the art would appreciate, FIGS. 4 and 5 illustrate logic steps for performing specific functions. In alternate embodiments, more or fewer logic steps may be used. In an embodiment of the present invention, a logic step may represent a software program, a software object, a software function, a software subroutine, a software method, a software instance, a code fragment, a hardware operation or user operation, singly or in combination.

In an embodiment of the present invention, the batch job execution system illustrated by FIGS. 1 and 2 is stored in an article of manufacture, such as a computer readable medium. For example, batch job execution system 100 may be stored in a magnetic hard disk, an optical disk, a floppy disk, CD-ROM (Compact Disk-Read Only Memory), RAM (Random Access Memory), ROM (Read Only Memory), or other readable or writeable data storage technologies, singly or in combination. In such an embodiment each part of the batch job execution system is stored on an article of manufacture, singly or in combination and may be referred to as a component. For example, the client communications part stored on an article of manufacture may be referred to as the client communications software component.

The method illustrated in FIG. 4 is described with reference to batch job execution system 100 of FIG. 1. In step 402, a user submits a job to one of clients 102a–102c. The user also submits any processing parameters needed by the job management apparatus to perform the job.

In step 404 of FIG. 4, the receiving client prepares a batch job based on the received information and passes the batch job to client communications part 112 of job management apparatus 104. In step 406, the batch job is stored in job database 114. Before proceeding further, in step 408, job management apparatus 104 determines whether the job execution system 100 is able to process the newly received batch job. In some rare instances, job execution system 100 may not be ready to begin processing if, for example, the system is very close to its resource limits. If job execution system 100 is not ready, in step 410 the batch job is held in a job queue and control returns to step 408. In an alternative embodiment, the batch job is simply left in job database 114 as control returns to step 408. When job execution system 100 becomes available for processing, retrieving part 118 retrieves the batch job from the queue or job database 114, and prepares the job for processing in step 411.

In step 412 of FIG. 4, one or more tasks are extracted by extracting part 120 from the batch job. In an embodiment, the tasks are identified using a program transmitted by the client to job management apparatus 104 with the batch job. The program contains sets of definitions or "steps" which identify the particular services required to complete the tasks of the batch job. The program contains references to documents and other files stored in repository 116 on which services are to be performed, as well as other input parameters for processing. The program may be one of a library of programs maintained on some suitable storage medium accessible by job management apparatus 104. The user requests a particular program from the library when he submits the batch job and sends any parameters needed for the program to function properly.

In step 414 of FIG. 4, the extracted tasks are queued in queue 122. In step 416, assigning part 108 determines whether there are any existing tasks in queue 122 that have not been executed. If there are outstanding tasks, in step 418, the batch job is ultimately completed by executing the tasks stored in queue 122. Each task is executed by delegating the task to an independent service provider upon receiving a request for work from the independent service provider. In this way, minimal information is exchanged between job management apparatus 104 and the service providers, and maximal independence of the service providers is preserved. In step 418, as the batch job is executed, status information regarding the batch job, stored in job database 114, is updated. In some embodiments, this information is made available to the clients 102*a*–102*c* so the user can monitor the status of the job as it is executed.

As tasks are completed, any pending tasks which are dependent upon information from completed tasks can be loaded into the queue for processing. Multiple pending tasks may be queued and executed in parallel, using multiple service providers.

In step 416 of FIG. 4, if there are no outstanding tasks queued in queue 122, this indicates that all of the tasks of the batch job have been completed, as shown in step 420. Status information regarding the batch job is updated to reflect that the job has been completed, in step 422. In some embodiments, client communications part 112 then sends a signal to clients 102*a*–102*c* indicating that the job is complete and communicates any additional information regarding the executed batch job in which the user may be interested, for example, the time of completion, cost, delivery information and other information. In other embodiments, the user requests information regarding the executed batch job from the system through clients 102*a*–102*c*. In step 424, this information is reported to the clients 102*a*–102*c* which may in turn report to the user.

FIG. 5 is a generalized flow diagram illustrating a method of delegating tasks of a batch job for execution by service providers according to an embodiment of the present invention. The method illustrated in FIG. 5 is described with reference to batch job execution system 100 of FIG. 1. In step 502 of FIG. 5, a service provider requests work by sending a request_work signal to assigning part 108 of job management apparatus 104. Generally the service provider sends the request_work signal only when that service provider is available to perform work. In this way, the job execution system need not "start" a service provider or some other software or hardware to force the service provider to perform the tasks needed to complete the job. This improves the efficiency of job execution system 100, as job management apparatus 104 does not need any information that would otherwise be required to drive the service providers. This, in turn, maximizes the independence of job management apparatus 104 because there are no constraints on the types of service providers which may be used and interchanged with one another.

The request_work signal identifies the requesting service provider by a name assigned to it by job management apparatus 104, and the signal specifies a particular type of function or service which that service provider performs. The request_work signal also contains other information such as the identity of provider manager 124 to which control messages may be sent, and the minimum frequency at which progress reports should be expected from that service provider.

In some embodiments, when service providers performing the same function request work from job management apparatus 104, the job management apparatus allows the competing service providers to bid for the work. Based on the results of the bidding, assigning part 108 then delegates the task to the appropriate service provider. In an alternative embodiment, the job management apparatus simply arranges a priority to assign the work to one particular service provider whenever a conflict arises.

In step 504 of FIG. 5, responsive to receiving the request_work signal, assigning part 108 of job management apparatus 104 determines whether any of the tasks in queue 122 require a service corresponding to the function specified by the service provider in the request_work signal. In step 506, if a task in queue 122 can be performed by the requesting service provider, the task is assigned to that service provider and sent to the service provider for processing. The task assignment includes a unique identifier for that assignment.

The task assignment includes a complete description of the work to be performed. Specifically, the type of operation that the service provider is to perform on the task is identified. Depending on the particular batch job, this may include validating the task, estimating the time or cost for completing the task, preparing a bid for the task, or performing the task. Other special instructions are included pertaining to the type of operation requested and processing constraints such as maximum cost. The task assignment also includes references to any resources needed to perform the particular task involved, such as specific files in a repository, and delegations of authority to access those resources or perform other operations.

In FIG. 5, upon receiving the task assignment, in step 508, the service provider performs the task. While the task is being executed, the service provider sends status_report signals to contact part 110 to indicate how much of the task has been performed, and the estimated time remaining to complete the task. The status_report signal includes information identifying that particular service provider and the particular task being executed.

In step 510 of FIG. 5, the service provider sends a task_complete signal to contact part 110 of job management apparatus 104 when the service provider has performed the task delegated to it by job management apparatus 104. Output results from processing the task are also returned to contact part 110, so job management apparatus 104 may coordinate these results with results from other task assignments and handle as designated by the user. Output results are stored as files in a repository or recorded in the memory of a computer with other data structures. The output results may also include a bill of charges from the service provider to the job execution system.

In FIG. 5, upon receiving the task_complete signal from the service provider, job management apparatus 104 recognizes that the particular task delegated to that service provider has been performed. In one embodiment, where remaining tasks have not been extracted from the batch job, extracting part 120 extracts another task from the batch job and queues the task in queue 122. In other embodiments where all the tasks comprising the batch job have been extracted, job management apparatus 104 determines which tasks, if any, have not been performed. After all of the tasks have been performed, job management apparatus 104 dispenses the output results of the batch job as designated by the user.

In step 504 of FIG. 5, if there are no tasks in queue 122 which can be performed by the requesting service provider when the request_work signal is received, assigning part 108 records the name of the particular service provider which requested work and the services that service provider performs. In step 512, assigning part 108 then sends an idle_assignment signal to the service provider. In one embodiment, upon receiving the idle_assignment signal, the service provider stops sending request_work messages to the assigning part. In another embodiment, the service provider continues to send request_work messages to assigning part 108 until the service provider receives a task.

Later, when a task capable of being performed by the requesting service provider is queued in queue 122, in step 514, assigning part 108 sends a "work_available" signal to provider manager 124 indicating that a task, appropriate for the particular service provider which received the idle_assignment signal, is queued in queue 122. The provider manager then signals the service provider which received the idle_assignment signal that work is available. If the service provider is ready, the service provider resumes sending request_work messages to assigning part 108. The idle_assignment feature reduces the time and costs associated with the service provider repeatedly sending request_work messages to a job management apparatus having no tasks available to delegate.

Some exemplary service providers used with batch job execution systems constructed according to an embodiment of the present invention have the ability to adjust their capacities, such as by changing the number of people on duty to provide a particular function. When a backlog condition arises, as described above, job management apparatus 104 sends an "increase_capacity" signal to provider manager 124 indicating that a backlog is developing and specifying the size of the backlog. The increase_capacity signal also identifies a particular assigning part 108 to which request_work signals should be sent. Provider managers then respond by taking the necessary steps to increase their capacity, such as increasing the number of service providers running simultaneously. Some provider managers simply reply with an indication that capacity cannot be increased.

A service provider to which a task has been assigned may fail to complete the task. Such may occur, for example, if the machine on which the service provider is operating shuts down. In this situation, the service provider preferably sends a "task_incomplete" signal to contact part 110 of the job execution system Assigning part 108 of job management apparatus 104 then redistributes the task, which the particular service provider failed to complete, to another service provider upon request.

In some embodiments, the job management apparatus interacts with the service provider for some control purpose such as interrupting the processing of a task. Such may be desirable, for example, when the job management apparatus does not receive a status_report signal from the provider for some predetermined period of time. The lack of any status report suggests that the service provider has stopped performing. In this case, the job management apparatus sends one of a variety control signals to the provider manager associated with the service provider in question.

In one example, an "abort_assignment" signal is sent by the provider communications part to the provider manager when work in progress should be stopped. The abort_assignment signal includes information identifying the particular task involved and the name of the service provider that received the assignment. The assigning part of the job management apparatus then redistributes the task which the particular service provider failed to complete to a different service provider, upon request from the different service provider.

In another example, when no status_report signal has been received from a particular service provider by the contact part for some predetermined period of time, the provider communications part sends a "report_now" signal to the provider manager to request an immediate report. When no status report is received after the report_now signal is sent, the job management apparatus redistributes the task to a different service provider upon request. The provider communications part then sends a "provider_abandoned" signal to the provider manager indicating that the job management apparatus has assigned the work elsewhere, so the service provider can stop working on the assignment. In some embodiments, no new assignments will be given to the service provider which failed to provide the status report.

EXAMPLES

Batch job execution systems constructed according to an embodiment of the present invention uses as fully as possible all of the processing resources available. A variety of services are provided for batch jobs having individual tasks which have widely varying execution requirements. For instance, some tasks may require a program available on only a UNIX machine, while others require a commercial application running on a Windows NT machine. Other tasks require printing services from a print shop operating at a different site than where the job management apparatus and other service providers are operating. Still others require the services of human experts who function on their own schedules.

The following examples refer to the systems shown in FIGS. 1 and 3 by way of illustration. In these examples, a user has Internet access software operating on a personal computer. In one embodiment, the user simply dials the number of a local Internet service provider over a public switched telephone network ("PSTN") using a modem A communications path is established over the PSTN between the personal computer with the Internet service provider. In another embodiment, the user has a direct connection to the Internet. The user then accesses web server 102a through the Internet service provider.

Upon accessing web server 102*a*, the user then transmits or "uploads" a number of computer files or documents to web server 102*a* using a file upload function of his Internet access software. The user then specifies parameters for breaking the batch job into individual tasks and processing the batch job. These parameters may be transmitted with the batch job, although the parameters are preferably transmitted independently via an interface such as a web page. After delivering the file to web server 102*a*, the user does not need to concern himself with the management and execution of the batch job.

In a first example, the user desires that batch job execution system 100 correct grammar and spelling in a letter and mail a hard copy of the corrected letter to some designated person. The user submits the letter electronically to web server 102*a* in a generic text format. The user also specifies an address to which the letter will be delivered. Web server 102*a* passes the information as a batch job to client communications part 112. Job execution system 100 is available to begin processing the work immediately, so the batch job is passed to extracting part 120.

Using the information sent by the user with the batch job, extracting part 120 breaks the batch job into three successive tasks: (i) grammar check and spell check the document, (ii) convert the document from text format to Microsoft Word format, and (iii) print and deliver a hard copy of the document to the address specified by the user. These tasks are queued in queue 122.

Referring to FIG. 2, service providers 206*a*–206*c*, operating on Windows NT machines, provide spell check and grammar check applications. Service providers 208*a*–208*c* provide document format conversion services, also using software applications operating on Windows NT machines. A third group of service providers cooperates with a print shop subcontractor 304, as shown in FIG. 3, for printing and delivery services.

Service provider 206*a* sends a request_work signal to assigning part 210. Assigning part 210 sends the document to service provider 206*a* for processing. After checking the document for grammar and spelling errors and making any necessary revisions, service provider 206*a* sends a task_complete signal to contact part 212. Based on the task_complete signal, the job management system reviews the tasks that have not yet been made available to run, for example, because they are dependent upon executed tasks for necessary processing information, and determines which of these tasks may now be executed. When service provider 208*a* subsequently sends a request_work signal to assigning part 210, the corrected document is sent by assigning part 210 to service provider 208*a* for format conversion. Service provider 208*a* then formats the document and returns the document to contact part 212.

After the document has been corrected and formatted, when assigning part 212 receives a request_work signal from one of the third group of service providers, the corrected and formatted version of the document is sent to this service provider with the shipping address. The document is then sent by this service provider to print shop subcontractor 304 for printing and delivery. The document is delivered by any commercially or publicly available delivery service to the designated recipient.

In a second example, service providers 206*a*–206*c* provide electronic document format conversion from Microsoft Word to Corel WordPerfect. Service providers 208*a*–208*c* include human translators who translate documents from English to French and corrects style as needed. A third group of service providers are print shops which handle printing and delivery of letters.

The user submits an input electronic document in Microsoft Word format to batch job execution system 100 through web server 102*a* The user desires the output document to be in Corel WordPerfect format, so the user sends web server 102*a* parameters specifying WordPerfect 8.0 as the format for conversion. The user also specifies the format of the input document as Microsoft Word 8.0 in a similar manner. In other examples, the system 100 is capable of automatically detecting the format of the input document.

A first task is extracted from the batch job and queued in queue 122. The first task is document format conversion. In FIG. 2, when service provider 206*a* sends a request_work signal to assigning part 210, the first task is sent to service provider 206*a* The document is converted to WordPerfect format and returned to contact part 212. Then, a second task in the batch job is extracted by the extracting part and stored in the queue. The second task is language translation from English to French. Upon receiving a request_work signal from service provider 208*b*, assigning part 108 sends service provider 208*b* the WordPerfect document over the Internet via electronic mail.

The WordPerfect document is received on a computer used by the human translator. The translator then translates the document according to his own schedule. During this time, which may last several hours or several days, provider communications part 126 of job management apparatus 104 sends provider manager 124 report_now signals which are, in turn, communicated to service provider 208*b*. In response to these signals, service provider 208*b* sends status_report signals to contact part 212 of the job manager, estimating the amount of work done and the time until completion. In some embodiments, service provider 208*b* also sends provider manager 124 status_report signals.

Eventually, service provider 208*b* sends a task_complete signal to contact part 212 and returns the document in French. When assigning part 210 subsequently receives a request_work signal from a third service provider, the French WordPerfect document is submitted electronically to the third service provider for printing and delivery.

In a third example, the input file includes an image document which has been electronically scanned into machine-readable form. The user sends the document via facsimile transmission to FAX server 102*b*. The transmission includes a cover page for the document containing information describing what services are required to process the document. This may include, for instance, a resolution to which the document should be converted. Also, in this example, several e-mail addresses for intended recipients of the converted document are contained on the cover page.

The input file is captured by client communications part 112. The instructions on the cover page are stored as a batch job in job database 114. The image document is stored in repository 116. At some later time, retrieving part 118 retrieves the file from the repository, and extracting part 120 extracts the tasks from the input file. In this example, the extracted steps include converting the image to a different resolution, and e-mailing the converted image to the intended recipients. At least one service provider performs each of these functions, and the tasks are executed using the methods described above. The converted image document may be attached to an e-mail message using methods known to those skilled in the art.

Another example of a batch job which may be executed according to embodiments of the present invention includes the tasks of filtering an image file, changing the format of the image file, compressing the image file, attaching the compressed image to an e-mail, then sending the e-mail to a number of recipients.

In all of the examples above, processing of the batch job appears to be fully automated to the user. Thus, the user does not need to concern himself with the management and execution of the particular services required to achieve the results he desires. But in actuality, a number of services are often being performed. Batch job execution systems constructed according to an embodiment of the present invention manage the performance of an arbitrary variety of such services with a variety of implementations.

The foregoing description of embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined only by the following claims and their equivalents.

What is claimed is:

1. A job management apparatus for use in a batch job execution system including a plurality of service providers in communication with the job management apparatus, job management the apparatus implemented using one or more processor, and the job management apparatus comprising:
   a client communications part which receives a batch job from a client;
   an extracting part which extracts one or more task from the batch job; and,
   an assigning part which receives a request work signal from each of the plurality of service providers that is available to perform work for the batch job execution system, each request work signal informing the assigning part of one or more function or service that the service provider can perform;
   wherein the assigning part delegates each task to one of the service providers that can perform the function or service required to perform the task;
   wherein the assigning part sends an idle assignment signal to each service provider from which the request work signal is received but for which there is not a task available from the job management apparatus, the idle assignment signal informing the service provider to not send further request work signals to the assigning part until the service provider receives a work available signal from the assigning part, thereby freeing up resources of each service provider for which there is not a task available from the job management apparatus to perform other tasks not delegated by the job management apparatus; and
   wherein the assigning part sends a work available signal to each service provider that was previously sent the idle assignment signal but for which a task is available from the job management apparatus, to thereby inform each service provider that had stopped sending request work signals to the assigning part to thereafter send a work request signal when the service provider is available to perform work.

2. The job management apparatus of claim 1, wherein the plurality of service providers are operating on a plurality of machines.

3. The job management apparatus of claim 1, further comprising at least one contact part which receives a status report signal from the service providers, which updates the status of the task being performed by the service provider.

4. The job management apparatus of claim 3, wherein the work request signal specifies a minimum frequency at which the status report signal will be sent to the contact part.

5. The job management apparatus of claim 3, wherein the status report signal informs the contact part of completion of the task.

6. The job management apparatus of claim 1, further being in communication with a job database which stores the batch job upon receipt from the client; and
   the job database being regularly updated as jobs are executed by batch job execution system.

7. The job management apparatus of claim 6, further comprising a retrieving part which retrieves the batch job from the job database when the batch job is to be executed.

8. A computer implemented method for preparing and executing a batch job by a batch job execution system, comprising the steps of:
   submitting a batch job with processing parameters to a job management apparatus;
   storing the batch job in a job database;
   receiving a work request signal from each of a plurality of service providers that is available to perform work for the batch job execution system, each work request signal informing the job management apparatus of one or more function or service that the service provider can perform;
   determining whether the batch job execution system is able to process the batch job;
   extracting at least one task from the batch job;
   delegating each task to one of the service providers that can perform the function or service required to perform the task; and
   sending an idle assignment signal to each service provider from which the request work signal is received but for which there is not a task available from the job management apparatus, the idle assignment signal informing the service provider to not send further request work signals to the job management apparatus until the service provider receives a work available signal from the job management apparatus, thereby freeing up resources of each service provider for which there is not a task available from the job management apparatus to perform other tasks not delegated by the job management apparatus; and
   sending a work available signal to each service provider that was previously sent the idle assignment signal but for which a task is available from the job management apparatus, to thereby inform each service provider that had stopped sending request work signals to thereafter send a work request signal when the service provider is available to perform work.

9. The method of claim 8, further comprising the step of retrieving the batch job from the batch job database prior to the step of extracting at least one task.

10. The method of claim 8, wherein the step of delegating further comprises delegating a plurality of tasks to the plurality of service providers to be performed in parallel.

11. The method of claim 8, wherein the step of performing, further includes receiving a status report signal from the service provider performing the task which updates the status of the task being performed.

12. The method of claim 8, further comprising determining whether the batch job execution system is able to process the batch job; wherein the step of determining further includes assigning additional service providers to perform tasks for the job management apparatus if it is determined that the batch job execution system is unable to process the job.

13. The method of claim 8, further comprising the steps of:
communicating with the service provider performing the task after a predetermined time;
informing the job management apparatus of the tasks status; and,
the job management apparatus determining whether to re-assign the task or wait for task completion in response to the step of updating the task status.

14. The method of claim 8, further comprising the step of terminating the step of performing the task in response to receiving a signal from the job management apparatus, prior to the step of completing the task.

15. An article of manufacture including an information storage medium wherein is stored information comprising;
a client communications software component which receives a batch job from a client;
an extracting software component which extracts one or more task from the batch job; and,
an assigning software component which receives a request work signal from each of a plurality of service providers that is available to perform work, each request work signal informing the assigning part of the function or service that the service provider performs;
wherein the assigning software component delegates each task to one of the service providers that can perform the function or service required to perform the task;
wherein the assigning software component sends an idle assignment signal to each service provider that sent a request work signal but for which there is not a task available from the assigning software component, the idle assignment signal instructing the service provider to not send further request work signals until the service provider receives a work available signal from the assigning software component, thereby freeing up resources of each service provider for which there is not a task available from the assigning software component to perform other tasks not delegated by the assigning software component; and
wherein the assigning software component sends a work available signal to each service provider that was previously sent the idle assignment signal but for which a task is available from the job management apparatus, to thereby inform each service provider that had stopped sending request work signals to the assigning software component to thereafter send a work request signal when the service provider is available to perform work.

16. The article of manufacture of claim 15, wherein the assigning software component monitors which service providers are able to perform a task.

17. The article of manufacture of claim 15, further comprising a contact software component which receives a status report signal from the plurality of service providers which informs the contact software component of the status of the task being performed.

18. The article of manufacture of claim 17, wherein the work request signal specifies a minimum frequency at which the status report signal will be sent to the contact software component.

19. The article of manufacture of claim 15, further comprising a job database software component which stores the batch job upon receipt from the client, wherein the client communications software component is in communication with the job database software component.

20. The article of manufacture of claim 19, further comprising a retrieving software component which retrieves the batch job from the job database software component when the batch job is to be executed.

21. The article of manufacture of claim 15, further comprising at least one provider manager software component in communication with the plurality of service providers which monitors the tasks being performed on the service providers and provides status information to the job management software component.

* * * * *